United States Patent
Hashimoto et al.

(10) Patent No.: US 6,855,446 B1
(45) Date of Patent: Feb. 15, 2005

(54) FUEL CELL, SEPARATOR FOR FUEL CELL, AND MANUFACTURING METHOD OF SEPARATOR

(75) Inventors: Keiji Hashimoto, Toyota (JP); Masanao Shiomi, Toyota (JP); Hirotaka Fukatsu, Toyota (JP); Kousuke Kawajiri, Toyota (JP); Seiken Hashimoto, Toyota (JP); Hiroyuki Morita, Toyota (JP)

(73) Assignee: Toyota Auto Body Co., Ltd., Kariya (JP)

( * ) Notice: Subject to any disclaimer, the term of this patent is extended or adjusted under 35 U.S.C. 154(b) by 0 days.

(21) Appl. No.: 09/623,023
(22) PCT Filed: Dec. 17, 1999
(86) PCT No.: PCT/JP99/07104
§ 371 (c)(1),
(2), (4) Date: Oct. 20, 2000
(87) PCT Pub. No.: WO00/39872
PCT Pub. Date: Jul. 6, 2000

(30) Foreign Application Priority Data

Dec. 25, 1998 (JP) .............................. 10-371200

(51) Int. Cl.[7] .......................... H01M 8/02; B29C 45/14
(52) U.S. Cl. .......................... 429/34; 427/115; 264/239; 264/404
(58) Field of Search ...................... 427/115; 429/34–39; 264/278, 239, 405, 449, 478, 402, 404

(56) References Cited

U.S. PATENT DOCUMENTS

| 4,225,654 | A | * | 9/1980 | Tajima et al. ............... 429/154 |
| 4,648,955 | A | | 3/1987 | Maget |
| 5,639,403 | A | * | 6/1997 | Ida et al. ..................... 264/255 |
| 5,798,188 | A | | 8/1998 | Mukohyama et al. |
| 6,228,518 | B1 | * | 5/2001 | Kindler ....................... 429/13 |

FOREIGN PATENT DOCUMENTS

| JP | 61-253768 | | 11/1986 |
| JP | 61-284064 | | 12/1986 |
| JP | 5-74469 | | 3/1993 |
| JP | 05-074469 A | * | 3/1993 |
| JP | 06052881 | | 2/1994 |
| JP | 06-052881 A | * | 2/1994 |
| JP | 8-507402 | | 8/1996 |
| JP | 11-126621 | | 5/1999 |
| JP | 2000-12048 | | 1/2000 |
| WO | 94/09519 | | 4/1994 |

* cited by examiner

Primary Examiner—Susy Tsang-Foster
(74) Attorney, Agent, or Firm—Oliff & Berridge, PLC (57) ABSTRACT

A fuel cell composed of a plurality of cell function assemblies of each of which includes a set of spaced electrolytic membranes, two pairs of electrode plates in contact with opposite surfaces of each of the electrolytic membranes, a set of separators, and a set of six support frames assembled to retain the electrolytic membranes and separators in position. In the fuel cell, the separators each are in the form of a flat plate of synthetic resin integrally provided with a plurality of spaced projections made of pressed carbon powder and retained in contact with the electrode plates to form a pair of reaction chambers at opposite sides of each of the electrolytic membranes.

6 Claims, 10 Drawing Sheets

FUEL CELL, SEPARATOR FOR FUEL CELL, AND MANUFACTURING METHOD OF SEPARATOR

BACKGROUND OF THE INVENTION

1. Field of the Invention

The present invention relates to a fuel cell in which fuel gas and oxidizing agent gas are used as reaction gases and also relates to a separator for the fuel cell and a manufacturing method of the separator.

2. Technical Background

Figure 1:
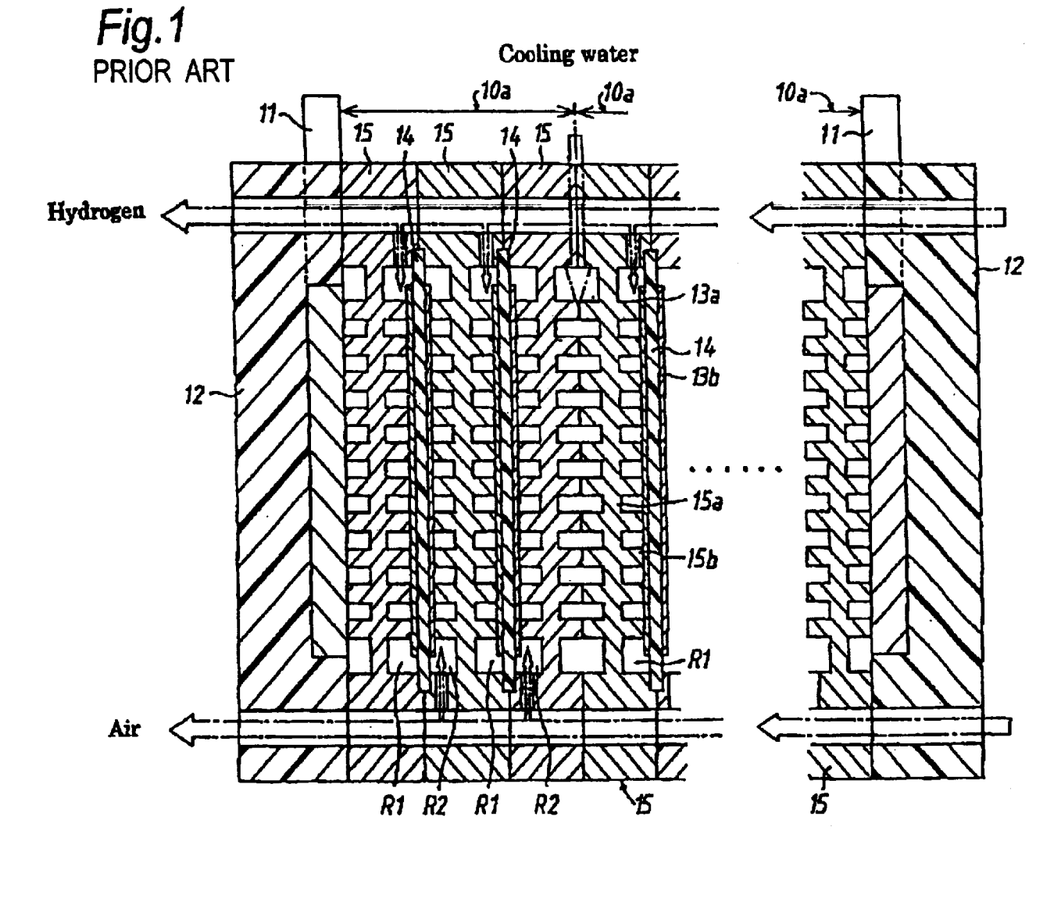
FIG. 1 is a vertical sectional view of a portion of a conventional fuel cell.

Disclosed in Japanese Patent Laid-open Publication Nos. 8-507402 and 11-126621 is a fuel cell in which fuel gas and oxidizing agent gas are used as reaction gases. The fuel cell is composed of a plurality of cell function assemblies arranged in parallel and fastened by a plurality of mounting bolts through a pair of spaced current-collecting plates made of conductive material and a pair of spaced insulation support plates. The cell function assemblies each are in the form of a cell function assembly 10a as shown in FIG. 1. The cell function assembly 10a is composed of a set of spaced solid electrolytic membranes 14, two pairs of electrode plates 13a, 13b adhered to opposite surfaces of each solid electrolytic membrane 14, and a set of three separators 15 assembled to retain the solid electrolytic membranes 14 in position. The separators 15 are adhered to one another by means of an adhesive agent such as epoxy resin and fastened by mounting bolts through a pair of spaced current-collecting plates 11 and a pair of spaced insulation support plates 12.

In the fuel cell, the separator 15 is, in general, made of conductive material such as carbon resistant to oxidation-reduction atmosphere caused by chemical reaction of the reaction gases. The separators 15 are arranged to form reaction chambers R1, R2 for chemical reaction of the reaction gases in the cell function assembly 10a and to derive an electric power generated at the electrode plates 13a, 13b to the exterior. The separator 15 has a flat plate portion 15a forming the reaction chambers R1, R2 and a plurality of columnar projections 15b in contact with the electrode plates 13a, 13b.

For manufacture of the separator 15, an expensive carbon block of predetermined thickness is used as a material of the separator 15. In a manufacturing process of the separator 15, the carbon block is machined by cutting at one side or both sides thereof to form the columnar projections 15b of separator 15. As the cutting process of the carbon block is time-consuming, the manufacturing cost of the separator 15 becomes very expensive, for example, several ten thousand yen per one piece. Due to such expensive manufacturing cost, use of this kind of fuel cell may not be widely popularized.

As the separator 15 in the fuel cell is conductive in its entirety, the components of cell function assembly 10a are electrically connected. For this reason, an electric power may not be generated at different voltages in the fuel cell.

It is, therefore, a primary object of the present invention to reduce the manufacturing cost of the separator as lower as possible for providing this kind of fuel cells at a low cost.

A secondary object of the present invention is to provide this kind of fuel cells capable of generating an electric power at different voltages in a range from a high voltage to a low voltage.

SUMMARY OF THE INVENTION

The present invention relates to a fuel cell of the type in which fuel gas and oxidizing agent gas are used as reaction gases and relates to a separator for the fuel cell and a manufacturing method of the separator.

A separator in accordance with the present invention comprises a flat plate arranged to form a reaction chamber, a plurality of projections projected from the flat plate and retained in contact with an electrode plate of the fuel cell, wherein the projections are made of a conductive material different from the material of the flat plate and independently from the flat plate.

In the separator, the projections may be made of carbon or in the form of an insulation plate. The projections may be also made of synthetic resin, in the form of a conductive plate or made of synthetic resin containing carbon.

Since the separator is composed of the flat plate of synthetic resin and the projections of pressed carbon powder mounted to the flat plate thereacross, the separator can be manufactured in a simple manner at a low cost without use of any expensive carbon block and without the cutting process required for manufacture of a conventional separator. This is useful to provide the fuel cell at a lower cost than a conventional fuel cell of this kind.

A fuel cell in accordance with the present invention is composed of a plurality of cell function assemblies arranged in parallel, wherein the cell function assembly comprises an electrolytic membrane, a pair of electrode plates in contact with opposite surfaces of the electrolytic membrane, a first separator placed in contact with one of the electrode plates to form a reaction chamber supplied with fuel gas, a second separator placed in contact with the other electrode plate to form a reaction chamber supplied with oxidizing agent gas, and a set of current-collecting plates assembled respectively in contact with the first separator at an outermost side of the cell function assembly and the second separator at another outermost side of the cell function assembly, and wherein the separator in accordance with the present invention is used as the first and second separators.

As the inexpensive separator is used in the fuel cell, the manufacturing cost of the fuel cell can be reduced in comparison with the conventional fuel cell of this kind.

In the fuel cell in accordance with the present invention, the electrode plate and the current-collecting plate can be formed as a single flat plate or formed in a divided condition in a longitudinal direction or width direction.

In the case that a separator with an insulation flat plate is used as the separator in the fuel cell, the current-collecting plates each may be divided into a plurality of spaced plates. To correspond with the current-collecting plates, the electrode plates each may be divided into a plurality of spaced plates in a longitudinal direction or width direction of the electrolytic membrane. In the fuel cell, a plurality of cell function portions are formed in an electrically separated condition. In the case that the cell function portions are electrically connected in an appropriate manner in the interior or exterior of the fuel cell, an electric power can be generated at different voltages from a lower voltage to a higher voltage.

A first manufacturing method of the separator in accordance with the present invention comprises a first process of pressing carbon powder to form the projections, a second process of coating a sealing adhesive agent on a flat plate of synthetic resin, and a third process of assembling the projections with a plurality of mounting holes formed in the flat plate in position.

A second manufacturing method of the separator in accordance with the present invention comprises a first process of heating carbon powder containing a binder under pressure to form the projections, a second process of coating a sealing adhesive agent on a flat plate of synthetic resin, and a third process of assembling the projections with a plurality of mounting holes form in the flat plate and securing the projections in position. In the manufacturing method, the projections can be heated by an electric current applied thereto to melt the binder contained therein and hardened by cooling.

A third manufacturing method of the separator in accordance with the present invention comprises a first process of pressing carbon powder containing a binder to form the projections, a second process of assembling the projections with a plurality of mounting holes formed in a flat plate of synthetic resin, and a third process of heating the projections under supply of an electric current to melt the binder contained therein and cooling the projections to harden them in position.

A fourth manufacturing method of the separator in accordance with the present invention comprises a first process of pressing carbon powder to form the projections under pressure, a second process of coupling the projections within corresponding recesses formed in each cavity of molding dies and clamping the molding dies, and a third process of injecting melted synthetic resin into the cavity of the molding dies in a clamped condition. In the fourth manufacturing method, a binder may be contained as a forming material in the carbon powder, and the carbon powder may be heated under pressure to form the projections.

A fifth manufacturing method of the separator in accordance with the present invention comprises a first process of filling carbon powder containing a binder in a plurality of upward recesses formed in a lower molding die in such a manner as to correspond with the projections, a second process of positioning a flat plate formed with a plurality of through holes on the lower molding die in such a manner that the through holes of the flat plate are opposed to the upward recesses of the lower molding die and positioning an upper molding die formed with a plurality of downward recesses on the flat plate so that the downward recesses of the upper molding die are opposed to the upward recesses of the lower molding die, and a third process of pressing the carbon powder filled in the upward recesses of the lower molding die toward the upper molding die by means of pressure means disposed in each bottom of the upward recesses so that the projections are formed across the through holes of the flat plate, of heating under supply of an electric current to melt the binder contained in the projections and of cooling the projections to harden them in position.

With the manufacturing methods described above, a separator composed of a flat plate of synthetic resin provided with a plurality of projections made of carbon can be manufactured at a low cost.

DESCRIPTION OF PREFERRED EMBODIMENTS

Figure 2:
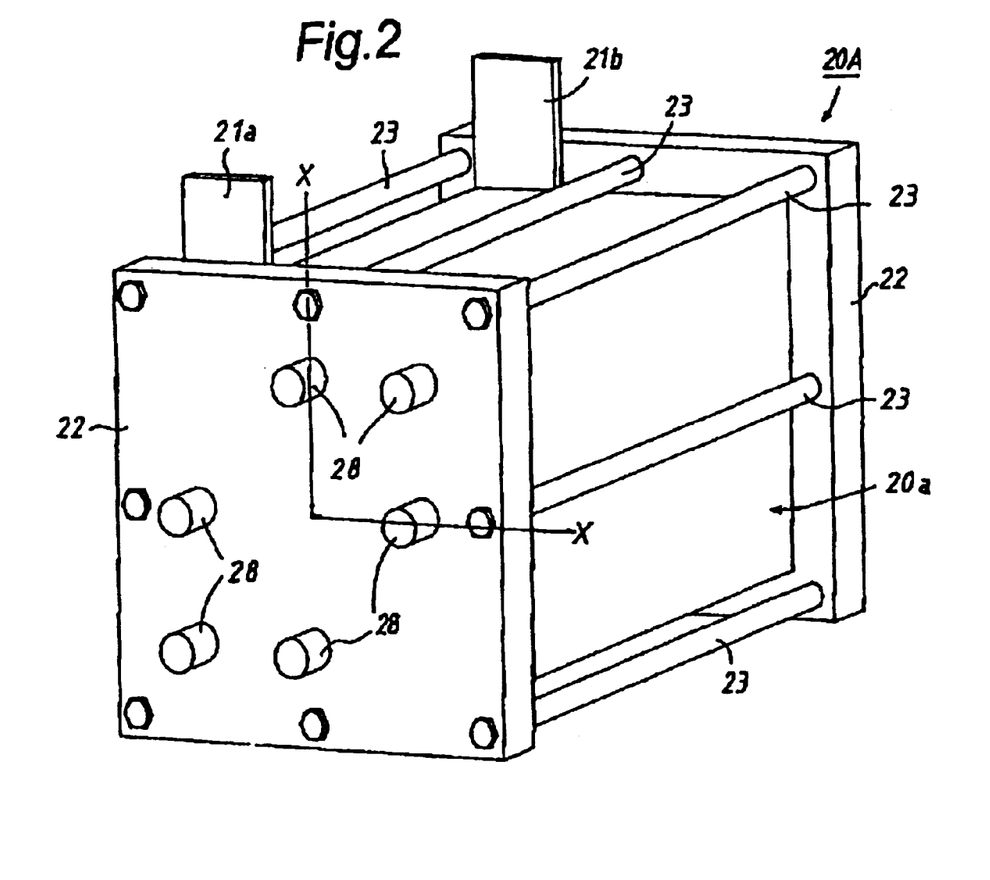
FIG. 2 is a perspective view of an embodiment of a fuel cell in accordance with the present invention.
Figure 3:
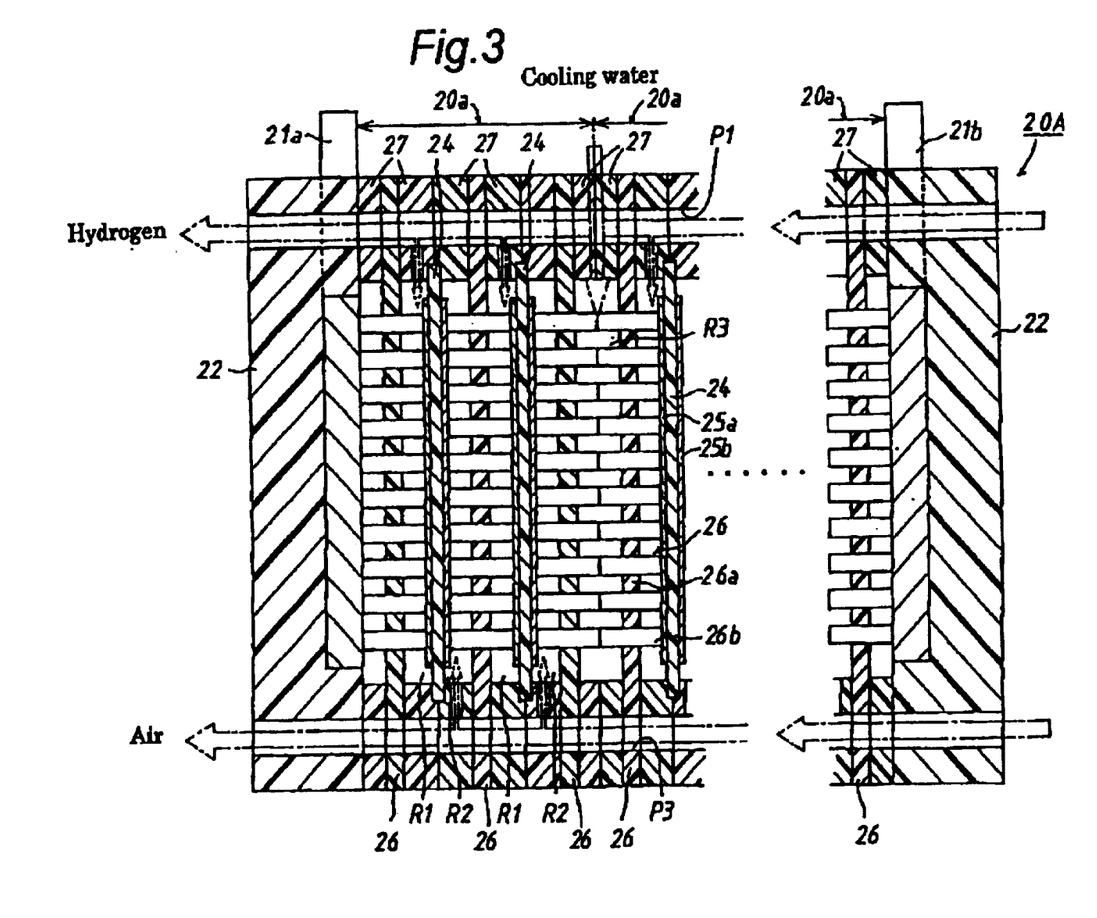
FIG. 3 is a vertical sectional view of the fuel cell taken along line X—X in FIG. 2.

First Embodiment of Fuel Cell:

Illustrated in FIGS. 2 and 3 is a first embodiment of a fuel cell 20A in accordance with the present invention, in which hydrogen gas is used as fuel gas and air is used as oxidizing agent gas. Assembled in the fuel cell 20 are separators in accordance with the present invention. The fuel cell 20A is composed of a plurality of cell function assemblies 20a arranged in parallel and fastened by a plurality of mounting bolts 23 through a pair of spaced current-collecting plates 21a, 21b made of conductive material such as stainless steel and a pair of spaced insulation support plates 22 made of synthetic resin such as polypropylene.

As shown in FIG. 3, the cell function assemblies 20a each are composed of a set of spaced solid electrolytic membranes 24, two pairs of electrode plates 25a, 25b adhered to opposite surfaces of each solid electrolytic membrane 24, a set of three separators 26 and a set of six support frames 27 assembled to retain the solid electrolytic membranes 24 and separators 26 in position. In the respective cell function assemblies 20a, the solid electrolyte membrane 24 is made of ion-exchange resin such as NAFION® (a trade name of a polymer made by E. I. du Pont de Nemours and Company), the electrode plates 25a, 25b each are in the form of a porous conductive plate made of carbon fabric with platinum catalyst deposited therein, and the support frame 27 is in the form of an insulation frame made of synthetic resin such as polypropylene.

Figure 4:
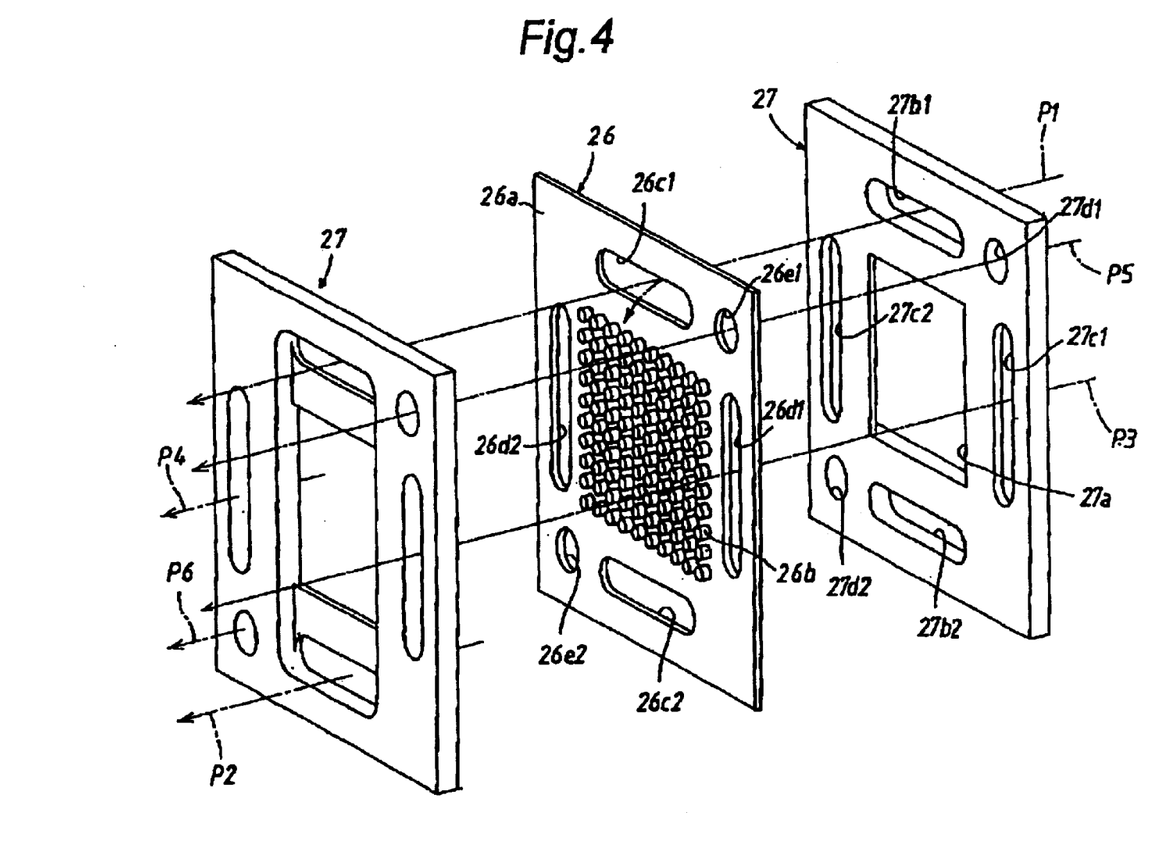
FIG. 4 is a perspective view illustrating a separator and a pair of support frames assembled in the fuel cell shown in FIG. 3.

The separator 26 is in the form of a rectangular flat plate 26a provided with a number of projections 26b. The flat plate 26a is in the form of an insulation plate made of synthetic resin such as polypropylene, and the projections 26b each are in the form of a conductive pillar body made of pressed carbon powder. The projections 26a are mounted within a number of mounting holes in the flat plate 26a and secured to the flat plate 26a in a condition where they are projected in the same length from opposite surfaces of the flat plate 26a. As shown in FIG. 4, the separator 26 has a fuel gas inlet hole 26c1 formed in an upper portion of flat plate 26a for providing a supply passage P1 of fuel gas, a fuel gas outlet hole 26c2 formed in a lower portion of flat plate 26a for providing an exhaust passage of the fuel gas. The separator 26 is further provided with an inlet hole 26d1 of oxidizing agent gas formed in a right-hand portion of flat plate 26a for providing a supply passage P3 of oxidizing agent gas, an outlet hole 26d2 of the oxidizing agent gas formed in a left-hand portion of flat plate 26a for providing an exhaust passage P4 of the oxidizing agent gas, an inlet hole 26e1 of cooling water formed in a right-hand upper corner of flat plate 26a for providing a supply passage P5 of cooling water, and an outlet hole 26e2 of cooling water formed in left-hand lower corner of flat plate 26a for providing a discharge passage P6 of cooling water.

The support frames 27 each are in the form of a rectangular flat plate formed at its central portion with a square opening 27a and formed at its outer peripheral portion with inlet and outlet holes 27b1, 27b2 of fuel gas respectively corresponding with the inlet and outlet holes 26c1, 26c2 of fuel gas formed in the separator 26, inlet and outlet holes 27c1, 27c2 of oxidizing agent gas respectively corresponding with the inlet and outlet holes 26d1, 26d2 of oxidizing agent gas formed in the separator 26, and inlet and outlet holes 27d1, 27d2 of cooling water respectively corresponding with the inlet and outlet holes 26e1, 26e2 of cooling water formed in the separator 26.

The inlet and outlet holes 27b 1, 27b2 of fuel gas are fitted with the corresponding inlet and outlet holes 26c1, 26c2 of fuel gas in the separator 26 for proving the supply passage P1 and exhaust passage P2 of fuel gas, and the inlet outlet holes 27c1, 27c2 of oxidizing agent gas are fitted with the corresponding inlet and outlet holes 26d1, 26d2 of oxidizing agent gas in the separator 26 for providing the supply passage P3 and exhaust passage P4 of oxidizing agent gas. Similarly, the inlet and outlet holes 27d1, 27d2 of cooling water are fitted with the corresponding inlet and outlet holes 26e1, 26e2 of cooling water in the separator 26 for providing the supply passage P5 and discharge passage P6 of cooling water.

The cell function assemblies 20a each include two sets of electrode plates 25a, 25b respectively adhered to two spaced solid electrolytic membranes 24 and three separators 26 which are alternately arranged and supported by six support frames 27. Thus, the fuel cell 20A is composed of a plurality of the cell function assemblies 20a each provided with a pair of current-collecting plates 21a, 21b and arranged in parallel between the support plates 22.

In the respective cell function assemblies 20a, the space between the solid electrolytic membranes 24 is subdivided by the flat plate 26a of the interim separator 26 into reaction chambers R1 and R2. The reaction chamber R1 is exposed to the electrode plate 25a and supplied with fuel gas such as hydrogen gas, while the reaction chamber R2 is exposed to the electrode plate 25b and supplied with oxidizing agent gas such as air. The space between the left-hand solid electrolytic membrane 24 and the left-hand support plate 22 is subdivided by the flat plate 26a of the left-hand separator 26 into a reaction chamber R1 which is exposed to the electrode plate 25a and supplied with the fuel gas, while the space between the right-hand solid electrolytic membrane 24 and the right-hand support plate 22 is subdivided by the flat plate 26a of the right-hand separator 26 into a reaction chamber R2 which is exposed to the electrode plate 25b and supplied with the oxidizing agent gas. The space between the separators 26 positioned at one sides of the cell function assemblies 20a adjacent to each other is formed as a cooling chamber R3 which is supplied with cooling air. The projections 26b of the interim separator 26 are retained in contact with the electrode plates 25a and 25b opposed to one another through the opening 27a of support frame 27. The projections 26b of the left-hand separator 26 are retained in contact with the electrode plate 25a and the left-hand current collecting plate 21a at their opposite ends, while the projections 26b of the right-hand separator 26 are retained in contact with the electrode plate 25b and the right-hand current collecting plate 21b at their opposite ends.

When the fuel cell 20A is not used, as shown in FIG. 2, the supply passage P1 and exhaust passage P2 of fuel gas, the supply passage P3 and exhaust passage P4 of oxidizing agent gas and the supply passage P5 and discharge passage P6 of cooling water each are closed by closure plugs 28. In use of the fuel cell 20A, the closure plugs 28 are removed to open the respective passages P1–P6, and the inlet ports of supply passages P1, P3 and P5 are connected to supply sources of hydrogen gas, air and cooling water, respectively. In such a condition, the fuel cell 20A is used under supply of the hydrogen gas, air and cooling water into the cell function assemblies 20a.

In the fuel cell 20A, the hydrogen gas is supplied into the reaction chambers R1 of the cell function assemblies 20a through the supply passage P1 and exhausted from the exhaust passage P2, and the air is supplied into the reaction chambers R2 of the cell function assemblies 20a through the supply passage P3 and exhausted from the exhaust passage P4. The cooling water is supplied into the cooling chamber R3 of the cell function assemblies 20a through the supply passage P5 and discharged from the discharge passage P6. The hydrogen gas and air supplied into the reaction chambers R1 and R2 causes an oxidation-reduction reaction through the solid electrolytic membranes 24 to generate an electric power at the electrode plates 25a, 25b. The oxidation-reduction reaction of hydrogen gas and air is enhanced by the platinum catalyst contained in the electrode plates 25a, 25b, and the generated electric power is derived to the exterior from the projections 26b of separators 26 retained in contact with the electrode plates 25a, 25b through the current collecting plates 21a, 21b. During use of the fuel cell 20A, the cell function assemblies 20a are cooled by the cooling water supplied into the cooling chamber R3 through the air supply passage P5.

Since the separators 26 assembled in the fuel cell 20A each are composed of the flat plate 26a of synthetic resin and the projections 26b of pressed carbon powder mounted to the flat plate 26a thereacross as described above, the separators 26 can be manufactured in a simple manner at a low cost without use of any expensive carbon block and without the cutting process required for manufacture of a conventional separator. This is useful to provide the fuel cell 20A at a lower cost than a conventional fuel cell of this type.

Although in the fuel cell 20A, the insulation flat plate 26a of synthetic resin and the conductive projections 26b of pressed carbon powder have been adapted to provide the separator 26, the flat plate 26a may be replaced with a conductive flat plate made of synthetic resin containing carbon powder.

Figure 5:
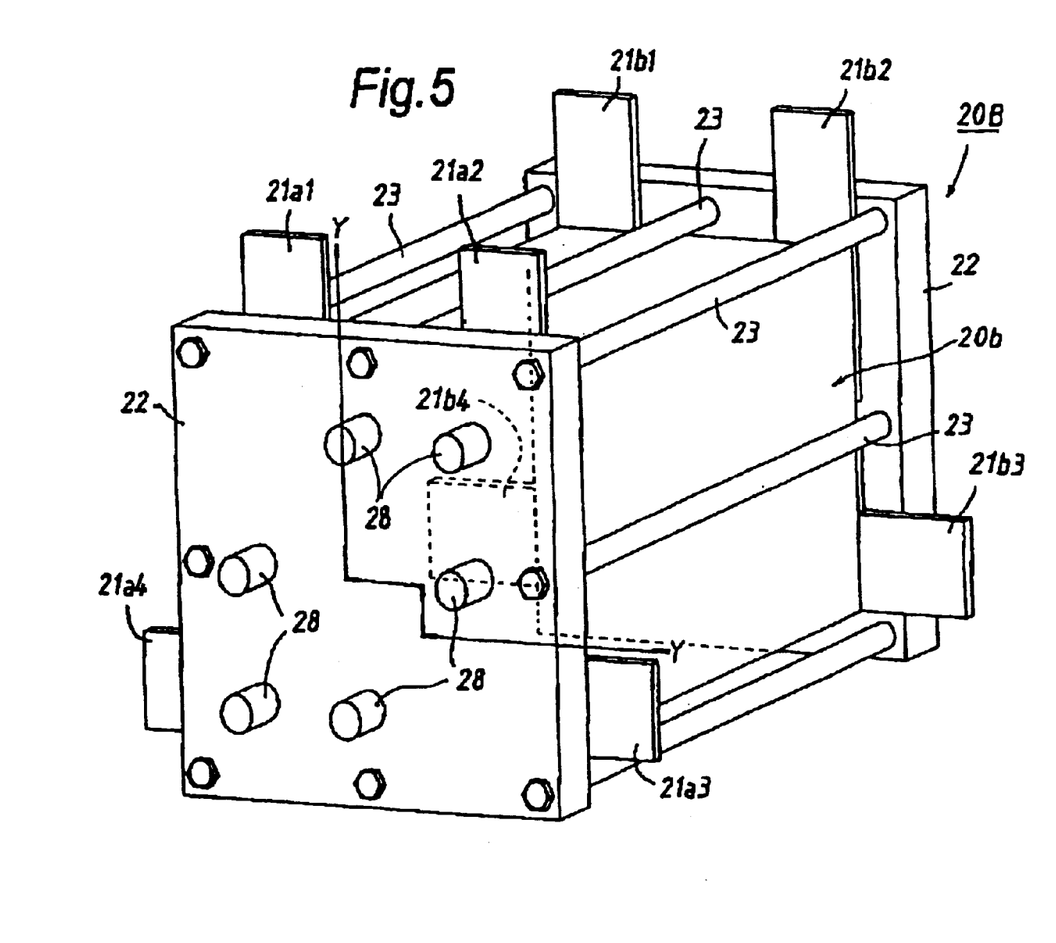
FIG. 5 is a perspective view of another embodiment of a fuel cell in accordance with the present invention.
Figure 6:
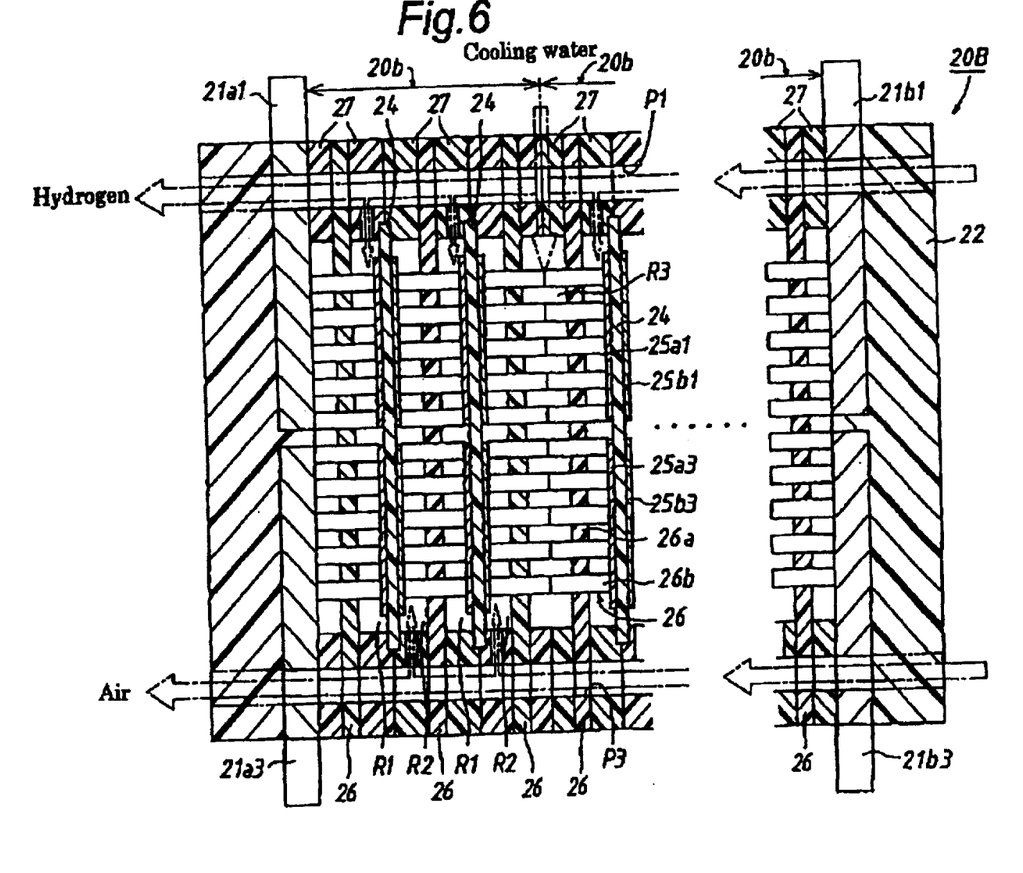
FIG. 6 is a sectional view of the fuel cell taken along line Y—Y in FIG. 5.

Second Embodiment of Fuel Cell:

Illustrated in FIGS. 5 and 6 is a second embodiment of a cell 20B in accordance with the present invention. In the fuel cell 20B, the hydrogen gas is used as fuel gas, the air is used as oxidizing gas, and the separators 26 in accordance with the present invention are assembled as in the fuel cell 20A of the first embodiment. As shown in FIG. 5, the fuel cell 20B is composed of a plurality of cell function assemblies 20b arranged in parallel and assembled with left-hand current-collecting plates 21a1–21a4, right-hand current-collecting plates 21b1–21b4 and a pair of spaced insulation support plates 22 which are fastened in place by means of a plurality of mounting bolts 23. The right-hand current collecting plate 21b4 is located at an opposite side of the current-collecting plate 21b3 in FIG. 5. The current-collecting plates 21a1–21a4 and 21b1–21b4 are made of conductive material such as stainless steel as in the fuel cell 20A of the first embodiment, and the support plates 22 are made of synthetic resin such as polypropylene.

Figure 7:
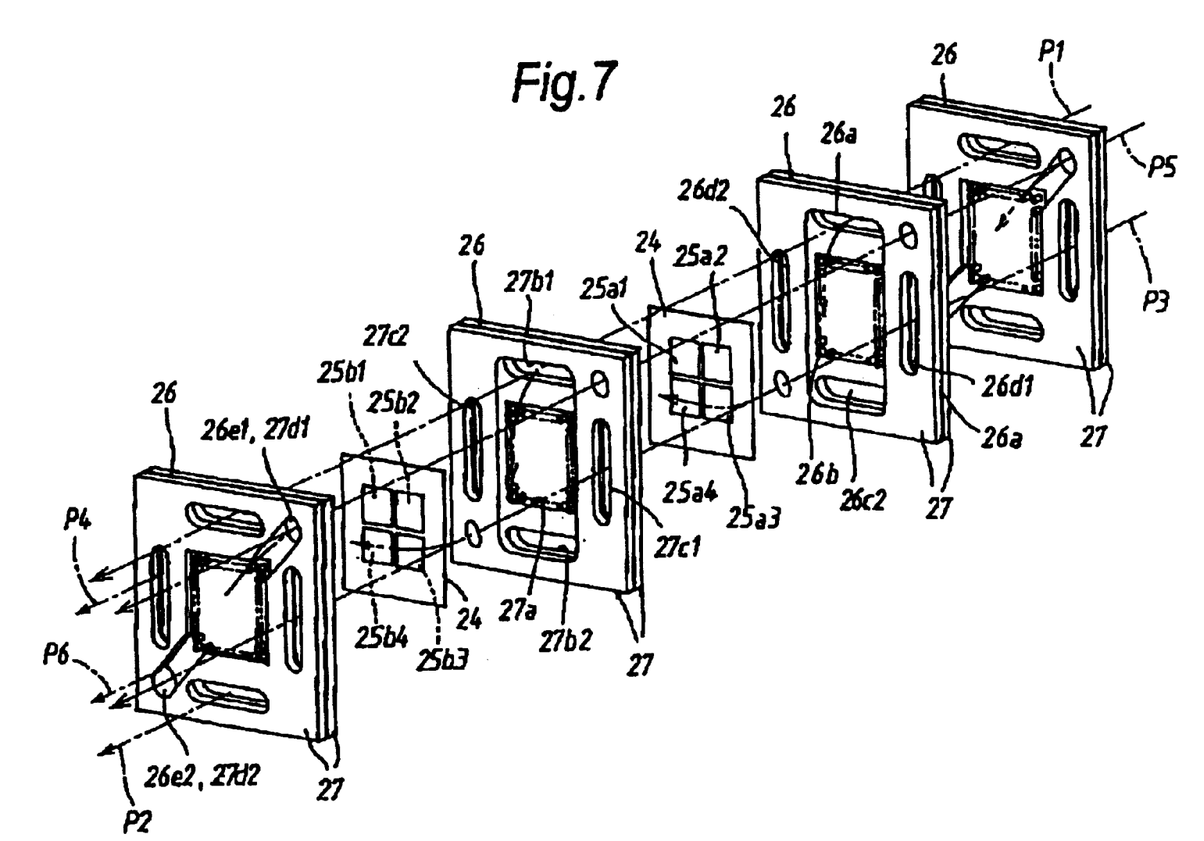
FIG. 7 is a perspective view illustrating a set of separators, a set of electrolytic membranes, a set of electrode plates and a pair of support frames assembled in the fuel cell shown in FIG. 5.

As shown in FIGS. 6 and 7, the cell function assemblies 20b each are composed of a set of spaced solid electrolytic membranes 24, four electrode plates 25a1–25a4 adhered to each left-side surface of solid electrolytic membranes 24, four electrode plates 25b1–25b4 adhered to each right-side surface of solid electrolytic membranes 24, a set of three separators 26, and a set of six support frames 27 assembled to alternately retain the solid electrolytic membranes 24 and separators 26 in position.

In the fuel cell 20B, the current-collecting plates 21a1–21a4, 21b1–21b4 are made of the same material as that of the current-collecting plates 21a, 21b in the fuel cell 20A and divided into four pieces, respectively. The solid electrolytic membranes 24, separators 26 and support frames 27 are the same as those in the fuel cell 20A of the first embodiment. The electrode plates 25a1–25a4 and 25b1–25b4 are made of the same material as that of the electrode plates 25a, 25b in the fuel cell 20A and divided into four pieces, respectively. In a condition where the electrode plates 25a1–25a4 and 25b1–25b4 have been assembled in the fuel cell 20B, they are opposed to the current-collecting plates 21a1–21a4 and 21b–21b4, respectively. The other construction of the fuel cell 20B is the same as that of the fuel cell 20A.

In the fuel cell 20B, the projections 26b of separators 26 in each cell function assembly 20b are retained in contact with the electrode plates 25a1–25a4 and 25b1–25b4 adhered to opposite surfaces of each solid electrolytic membrane 24 to provide four independent single cells corresponding with four sets of current collecting plates 21a1, 21b1; 21a2, 21b2; 21a3, 21b3; 21a4, 21b4 in the fuel cell 20B. Thus, in the fuel cell 20B, an electric power can be derived from each set of the current collecting plates and can be optionally generated at a different voltage by appropriate electric connection of each set of the current-collecting plates.

Figure 8:
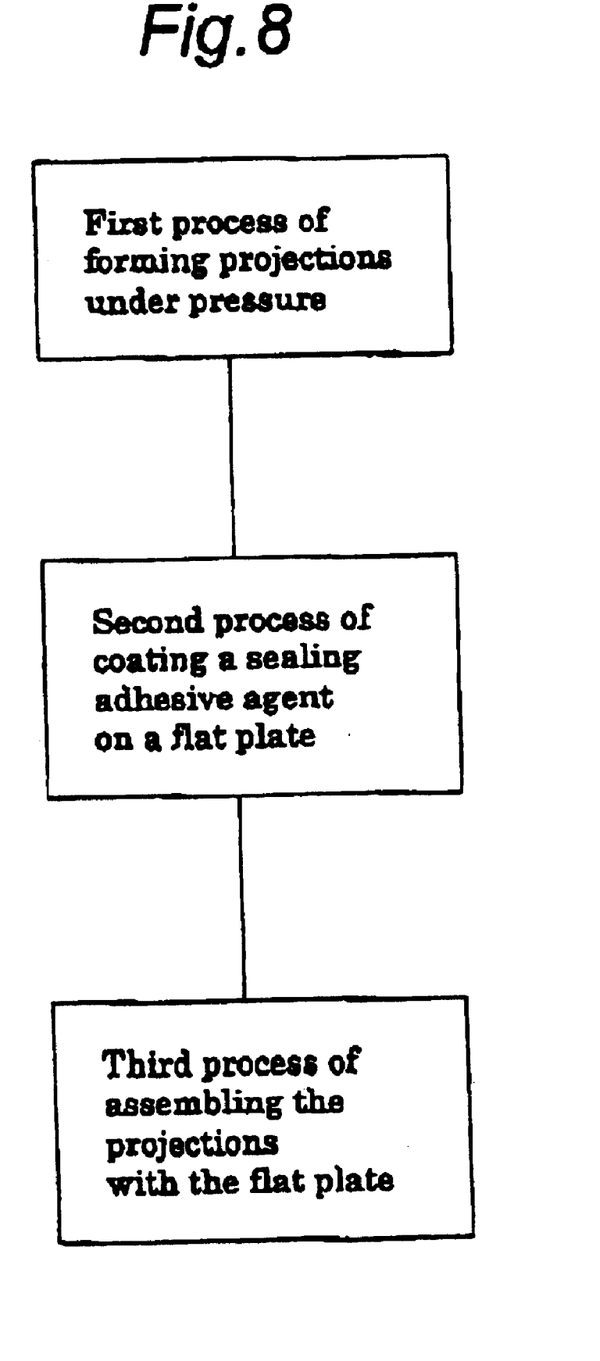
FIG. 8 illustrates a manufacturing process of the separator in accordance with the present invention.

The separator 26 can be manufactured at a lower cost less than the conventional separator for the following reason. As shown in FIG. 8, the separator 26 is manufactured by a first process of forming the projections 26b under pressure, a second process of coating a sealing adhesive agent on opposite surfaces of the flat plate 26a of synthetic resin preliminarily formed in a perforated flat plate, and a third process of assembling the projections 26b with a number of mounting holes of the flat plate 26a thereacross so that the projections 26b are secured by the adhesive agent in position.

In the manufacturing processes, carbon powder of less than 100 nm in pore size is used as a material of the projections 26b and pressed under a high pressure of from 500 kgf/cm² to 5000 kgf/cm² to form the projections 26b, for example, of 2 mm in diameter and 3 mm in length. The flat plate 26a is preliminarily prepared by an injection forming process and is formed with the inlet holes 26c1–26e1, outlet holes 26c2–26e2 and the mounting holes for engagement with the projections 26b. The flat plate 26a is made of synthetic resin such as polypropylene and prepared in the form of a square insulation plate of 1 mm in thickness and 150 mm in width. The mounting holes for engagement with the projections 26b may be formed during the forming process of the flat plate 26a or formed by drilling after the forming process of the flat plate 26a. The flat plate 26a may be made of synthetic resin containing carbon powder. In such a case, the flat plate 26a becomes conductive.

The sealing adhesive agent is used to secure the projections 26b assembled with the mounting holes of flat plate 26a in position in an air-tight manner. It is, therefore, preferable that the adhesive agent is coated on opposite surfaces of the flat plate 26a and inner peripheries of the mounting holes. As the adhesive agent, synthetic resin adhesive of acetic vinyl or polyester is used. In a condition where the projections 26b have been assembled with the mounting holes of flat plate 26a coated with the adhesive agent, the projections 26b are secured to the mounting holes of flat plate 26c in an air-tight manner by hardening of the adhesive agent. In the case that the flat plate 26a is prepared without the inlet holes 26c1–26e1 and outlet holes 26c2–26e2, the flat plate 26a is formed with the inlet holes 26c1–26e1 and outlet holes 26c2–26e2 after the projections 26b have been secured thereto.

Figure 9:
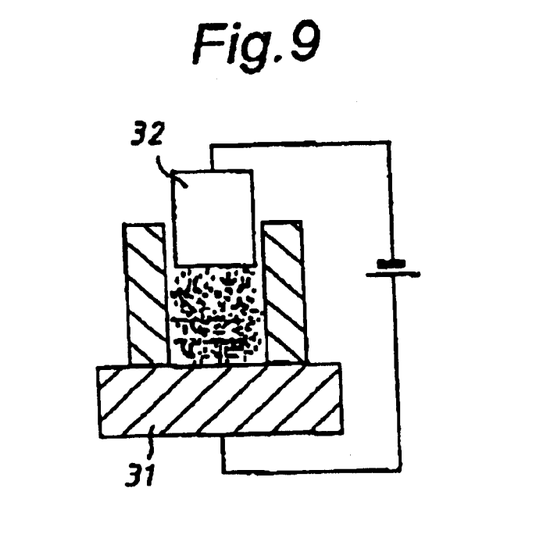
FIG. 9 illustrates a process for forming projections of the separator in accordance with the present invention.

In a second manufacturing method of the separator 26, carbon powder containing a binder is used as a material of the projections 26b. Although this manufacturing method is substantially the same as the first manufacturing method, the carbon powder is pressed under a medium pressure at a room temperature during the first forming process of the projections 26b, and the binder in carbon powder is molten by heat during the pressing process. Illustrated in FIG. 9 is a press-forming device which includes a die 31 filled with the carbon powder containing the binder, a punch 32 for pressing the carbon powder, and means for applying an electric current between the die 31 and punch 32.

In the manufacturing method, a thermoplastic binder of phenol resin is used as the binder. In such a case, the carbon powder is uniformly mixed with the binder of 10–20% by weight and pressed under a medium pressure of from 50 kgf/cm² to 500 kgf/cm² at a room temperature during which an electric current of 20 A to 50 A is applied at a voltage of 12 V between the die 31 and punch 32 for one second. In this instance, the binder in carbon powder is melted in a moment and hardened by cooling immediately after the supply of the electric current is stopped. With the manufacturing method, the projections 26b can be formed under a lower pressure than the forming pressure in the first manufacturing method.

In a third manufacturing method of the separator 26, carbon powder containing a binder is used as a material of the projections 26b. In this case, the separator 26 is manufactured by a first process of forming the projections 26b under pressure, a second process of assembling the projections 26b with a number of mounting holes formed in a flat plate 26a of synthetic resin and securing the projections in position, and a third process of heating the projections 26b mounted to the flat plate 26a so that the binder in projections 26b is melted by heat.

Figure 10:
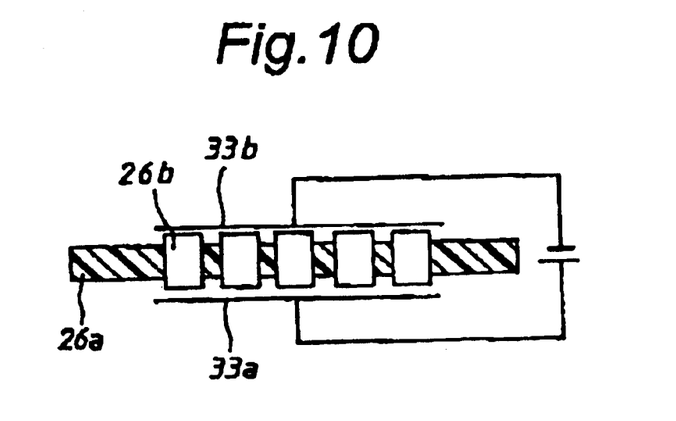
FIG. 10 illustrates a mounting process of projections of the separator.

In the manufacturing method, for example, a thermoplastic binder of phenol resin is used as the binder. In this case, the carbon powder is pressed under a medium pressure of from 50 kgf/cm² to 500 kgf/cm² at a room temperature during the first process, and as shown in FIG. 10, the projections 26b mounted to the flat plate 26a are placed between a pair of electrode plates 33a, 33b and applied with an electric current of from 5 A to 20 A at a voltage of 12V per one projection for one second. In this instance, the binder in projection 26b is melted in a moment and hardened by cooling immediately after the supply of the electric current is stopped. With the manufacturing method, the projections 26b of the same strength and hardness as those of the projections in the first manufacturing method can be formed without any use of a sealing adhesive agent, and the mounting strength of the projections 26b is enhanced.

In a fourth manufacturing method of the separator 26, carbon powder containing a binder is used as a material of the projections 26b. In this case, the separator 26 is manufactured by a first process of pressing the carbon powder to form the projections 26b under pressure, a second process of coupling the projections 26b within corresponding recesses formed in each cavity of molding dies and clamping the molding dies, and a third process of injecting melted synthetic resin into the cavity of the molding dies in a clamped condition.

Figure 11:
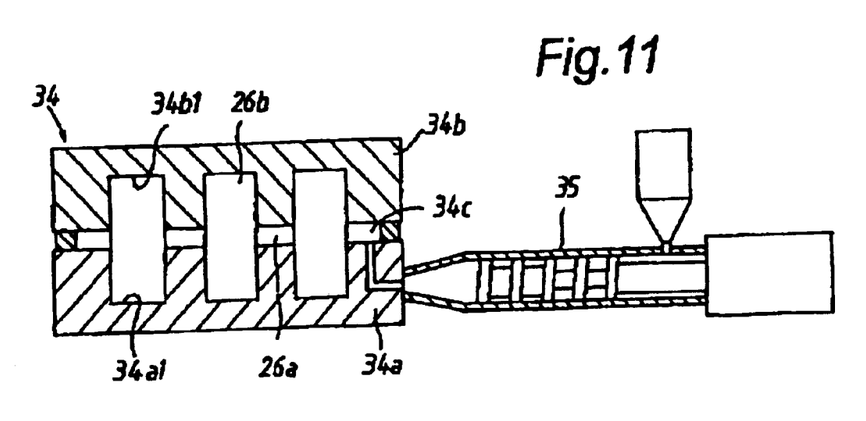
FIG. 11 illustrates a process for forming projections of the separator on the flat plate.

During the first process, the carbon powder is pressed under a high pressure of from 500 kgf/cm² to 5000 kgf/cm² at a room temperature. During the second process, as shown in FIG. 11, the projections 26b are coupled within the corresponding recesses 34a1 formed in a lower molding die 34a of a molding device 34, and an upper molding die 34b is placed on the lower molding die 34a in such a manner that the projections 26b are coupled within the corresponding recesses 34b1 formed in the upper molding die 34b. In such a condition, the molding dies 34a and 34b are clamped. During the third process, thermoplastic resin such as polypropylene in a melted condition is injected from an injection molding machine 35 into a cavity 34c of the molding device 34. Thus, the flat plate 26a of synthetic resin is formed in the cavity 34c of molding device 34, and the projections 26b are integrally formed with the flat plate 26a.

With the manufacturing method described above, the projections 26b can be integrally formed with the flat plate 26a during the forming process of flat plate 26a without forming a number of mounting holes in the flat plate 26a and without use of a sealing adhesive agent. Although in the manufacturing method, the carbon powder is used without containing any binder, carbon powder containing a binder may be used as a material of the separator 26. In such a case, the carbon powder is formed by heat-pressing as in the second manufacturing method.

In a fifth manufacturing method of the separator 26, carbon powder containing a binder is used as a material of the separator 26. In this case, the separator 26 is manufactured by a first process 6f filling the carbon powder in a plurality of recesses formed in a lower molding die in such a manner as to correspond with the projections 26b, a second process of positioning a flat plate 26a formed with a plurality of through holes on the lower molding die in such a manner that the through holes of the flat plate are opposed to the recesses of the lower molding die, and a third process of pressing the carbon powder filled in the recesses of the lower molding die toward an upper molding die by means of pressure pistons disposed in each bottom of the recesses so that the projections 26b are formed across the through holes of the flat plate and of heating the projections 26b by supply of an electric current to melt the binder contained in the projections 26b.

Figure 12:
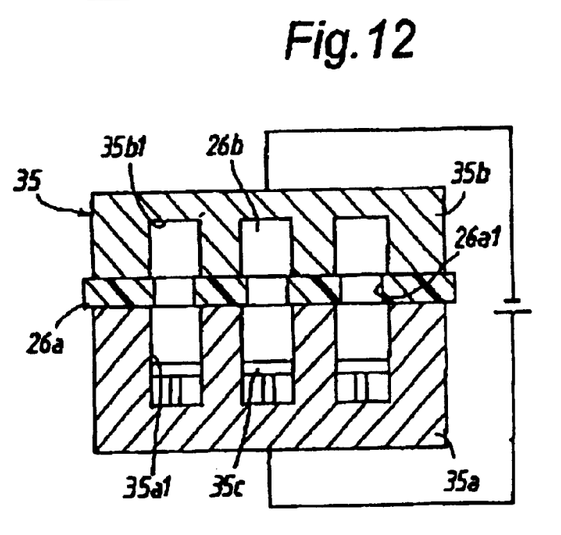
FIG. 12 illustrates another process for forming projections of the separator on the flat plate.

Illustrated in FIG. 12 is the third process in which a molding device 35 is used to integrally form the projections 26b with the flat plate 26a. The molding device 35 is composed of a lower molding die 35a, an upper molding die 35b and a plurality of pressure pistons 35c disposed in each bottom of upward recesses 35a1 formed in the lower molding die 35. In the manufacturing method, the carbon powder containing the binder is filled in the upward recesses 35a1 of lower molding die 35a during the first process. During the second process, the flat plate 26a is positioned on the lower molding die, and the upper molding die 35b is placed on the flat plate 26a in a condition where a plurality of downward recesses 35b1 formed in the upper molding die 35b are opposed to the upward recesses 35a1 of lower molding die 35a. In this case, the flat plate 26a is in the form of a flat plate of synthetic resin formed with a plurality of through holes 26a1 opposed to the upward recesses 35a1 of lower molding die 35.

During the third process, the pressure pistons 35c are moved under pressure to press upward the carbon powder filled in the recesses 35a1 of lower molding die 35a so that a portion of the carbon powder is introduced into the downward recesses 35b 1 of upper molding die 35b through the holes 26a1 of flat plate 26a. In this instance, the carbon powder in the recesses 35a1, 35b1 of both the molding dies 35a and 35b is pressed under pressure to form the projections 26b passing through the holes 26a1 of flat plate 26a. For example, the press-forming is effected under a medium pressure of from 50 kgf/cm² to 500 kgf/cm² at a room temperature. After the press-forming, an electric current of 20 A to 50 A is applied between the lower and upper molding dies 35a and 35b at a voltage of 12 V per one projection 26b for about one second. At this stage, the binder in the projections 26b is melted by heat in a moment and hardened by cooling after the supply of the electric current is stopped. With the manufacturing method, the projections 26b can be integrally formed with the flat plate 26a without coupling with the through holes 26a1 of flat plate 26a. The projections 26b of the same strength and hardness as those of the projections formed in the first manufacturing method can be formed under a lower pressure than that in the first manufacturing method.

What is claimed is:

1. A manufacturing method of a separator for use in a fuel cell in which fuel gas and oxidizing agent gas are used as reaction gases, comprising:

pressing carbon powder containing a binder to form a plurality of projections, each in the form of a conductive pillar body;

assembling the projections with a plurality of mounting holes formed in a flat plate of synthetic resin;

heating the projections by an electric current to melt the binder contained therein; and cooling the projections to harden them in position in the separator.

2. A manufacturing method of a separator for use in a fuel cell in which fuel gas and oxidizing agent gas are used as reaction gases, comprising:

pressing carbon powder containing a binder to form a plurality of projections each in the form of a conductive pillar body made of pressed carbon powder;

coating a sealing adhesive agent on a flat plate of synthetic resin;

assembling the projections with a plurality of mounting holes formed in the flat plate;

heating the projections by an electric current to melt the binder contained therein; and cooling the projections to harden them in position in the separator.

3. A manufacturing method of a separator for use in a fuel cell in which fuel gas and oxidizing agent gas are used as reaction gases, comprising:

filling carbon powder containing a binder in a plurality of upward recesses formed in a lower molding die in such a manner as to correspond with a plurality of projections;

positioning a flat plate of synthetic resin formed with a plurality of through holes on the lower molding die in such a manner that the through holes of the flat plate are positioned to correspond with the upward recesses of the lower molding die and positioning an upper molding die formed with a plurality of downward recesses on the flat plate so that the downward recesses of the upper molding die are opposed to the upward recesses of the lower molding die through the through holes of the flat plate;

pressing the carbon powder filled in the upward recesses of the lower molding die toward the upper molding die by means of pressure means disposed in each bottom of the upward recesses so that the projections are formed across the through holes of the flat plate;

heating the molding dies under supply of an electric current to melt the binder contained in the projections; and cooling the projections to harden them in position in the separator.

4. A fuel cell comprising:

at least a cell function assembly including a single electrolytic membrane;

a pair of electrode plates assembled in contact with opposite surfaces of the single electrolytic membrane;

a first separator in the form of a flat plate made of an insulation material and formed with a first plurality of conductive projections in contact with one of the electrode plates to form a reaction chamber to be supplied with fuel gas;

a second separator in the form of a flat plate made of an insulation material and formed with a second plurality of conductive projections in contact with the other electrode plate to form a reaction chamber to be supplied with oxidizing agent gas; and a set of current-collecting plates assembled respectively in contact with the first and second separators at opposite outermost sides of the cell, wherein the electrode plates each are divided into a first plurality of spaced plates, respectively in contact with opposite surfaces of the single electrolytic membrane, wherein the first and second separators each are in contact with the divided electrode plates, respectively at their conductive projections, and wherein the current-collecting plates each are divided into second plurality of spaced plates, respectively in contact with the first and second separators.

5. A fuel cell comprising:

at least a cell function assembly including a single electrolytic membrane;

a pair of electrode plates assembled in contact with opposite surfaces of the single electrolytic membrane;

a first separator placed in contact with one of the electrode plates to form a reaction chamber to be supplied with fuel gas;

a second separator placed in contact with the other electrode plate to form a reaction chamber to be supplied with oxidizing agent gas; and a set of current-collecting plates assembled respectively in contact with the first and second separators at opposite outermost sides of the cell, wherein the electrode plates each are divided into a first plurality of spaced plates, respectively in contact with opposite surfaces of the single electrolytic membrane, wherein the first and second separators each are composed of a perforated flat plate made of an insulation material and a plurality of conductive projections assembled with a plurality of mounting holes formed in the flat plate and placed, respectively in contact with the divided electrode plates, and wherein the current-collecting plates each are divided into a second plurality of spaced plates placed, respectively in contact with the first and second separators.

6. A fuel cell as claimed in claim 5, wherein the flat plate is made of synthetic resin, and wherein the conductive projections each are in the form of a conductive pillar body made of pressed carbon powder.

* * * * *